(12) United States Patent
Cheng et al.

(10) Patent No.: US 8,824,606 B2
(45) Date of Patent: Sep. 2, 2014

(54) MULTIPLE CORRELATORS FOR COMMUNICATION DEVICE DETECTION

(75) Inventors: Hao-Jen Cheng, Santa Clara, CA (US); Qinfang Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/465,613

(22) Filed: May 7, 2012

(65) Prior Publication Data

US 2013/0195229 A1 Aug. 1, 2013

Related U.S. Application Data

(60) Provisional application No. 61/592,183, filed on Jan. 30, 2012.

(51) Int. Cl.
*H03D 1/00* (2006.01)

(52) U.S. Cl.
USPC ............ 375/343; 329/308; 375/142; 375/150

(58) Field of Classification Search
None
See application file for complete search history.

(56) References Cited

U.S. PATENT DOCUMENTS

| | | | |
|---|---|---|---|
| 6,829,288 B2 | 12/2004 | Orava | |
| 7,809,083 B1 | 10/2010 | Wu et al. | |
| 2003/0043947 A1* | 3/2003 | Zehavi et al. | 375/365 |
| 2005/0078614 A1 | 4/2005 | Haartsen | |
| 2007/0036247 A1* | 2/2007 | Capretta et al. | 375/343 |
| 2008/0061870 A1 | 3/2008 | Tingwu et al. | |
| 2013/0188538 A1* | 7/2013 | Kainulainen et al. | 370/310 |

FOREIGN PATENT DOCUMENTS

| | | |
|---|---|---|
| WO | 2009093892 A1 | 7/2009 |
| WO | 2013116373 | 8/2013 |

OTHER PUBLICATIONS

"Bluetooth Low energy Controller Specification", Jun. 17, 2009, V0.9, R31, LOW_ENERGY_PS,Prepared by ULP WG, E-mail Address ULP-Feedback@Bluetooth.org, N.B.Confidential Mar. 28, 2009 , pp. 19-37.
Co-pending U.S. Appl. No. 61/592,183, filed Jan. 30, 2012, 21 pages.
PCT Application No. PCT/US2013/023906 International Search Report, 9 pages, Jun. 25, 2013.

* cited by examiner

*Primary Examiner* — Adolf Dsouza
(74) *Attorney, Agent, or Firm* — DeLizio Gilliam, PLLC

(57) ABSTRACT

A receiver unit of a communication device can employ multiple correlators for decoding the access address of a packet received from another communication device. A dynamically determined primary frequency offset is applied to a phase difference signal that is determined from an RF signal that comprises the packet. For each of a plurality of access address decoding chains of the receiver unit, a secondary frequency offset associated with the access address decoding chain is applied to the phase difference signal, the phase difference signal is correlated with a predetermined access address of the communication device, and a resultant correlation output is compared against a correlation threshold. One of the access address decoding chains that generated the correlation output that is greater than the correlation threshold is selected and the packet is demodulated based, at least in part, on the phase difference signal corresponding to the selected access address decoding chain.

30 Claims, 4 Drawing Sheets

MULTIPLE CORRELATORS FOR COMMUNICATION DEVICE DETECTION

RELATED APPLICATION

This application claims the priority benefit of U.S. Provisional Application Ser. No. 61/592,183 filed on Jan. 30, 2012.

BACKGROUND

Embodiments of the inventive subject matter generally relate to the field of communication networks and, more particularly, to a mechanism for employing multiple correlators for communication device detection.

The Bluetooth® wireless communication standard is typically employed for exchanging communications between fixed or mobile Bluetooth-enabled devices over short distances. Bluetooth Low Energy (BLE) communication protocol is an extension of the Bluetooth communication standard and is focused on energy-constrained applications such as battery-operated devices, sensor applications, etc.

SUMMARY

Various embodiments of a mechanism for employing multiple correlators for communication device detection are disclosed. In one embodiment, a radio frequency (RF) signal comprising one or more packets is received at a first communication device from a second communication device of a communication network. The one or more packets comprise a plurality of symbols and the one or more packets comprise an access address associated with the first communication device. A dynamically determined primary frequency offset is applied to a phase difference signal that is determined from the received RF signal. For each of a plurality of access address decoding chains of a receiver unit of the first communication device, a secondary frequency offset associated with the access address decoding chain is applied to the phase difference signal. Furthermore, for each of the plurality of access address decoding chains of the receiver unit, the phase difference signal is correlated with a predetermined access address associated with the first communication device, and a correlation result of said correlating the phase difference signal with the predetermined access address associated with the first communication device is compared against a correlation threshold. It is then determined that a first of the plurality of access address decoding chains generated the correlation result that is greater than or equal to the correlation threshold. The one or more packets are demodulated based, at least in part, on the phase difference signal corresponding to the first of the plurality of access address decoding chains.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
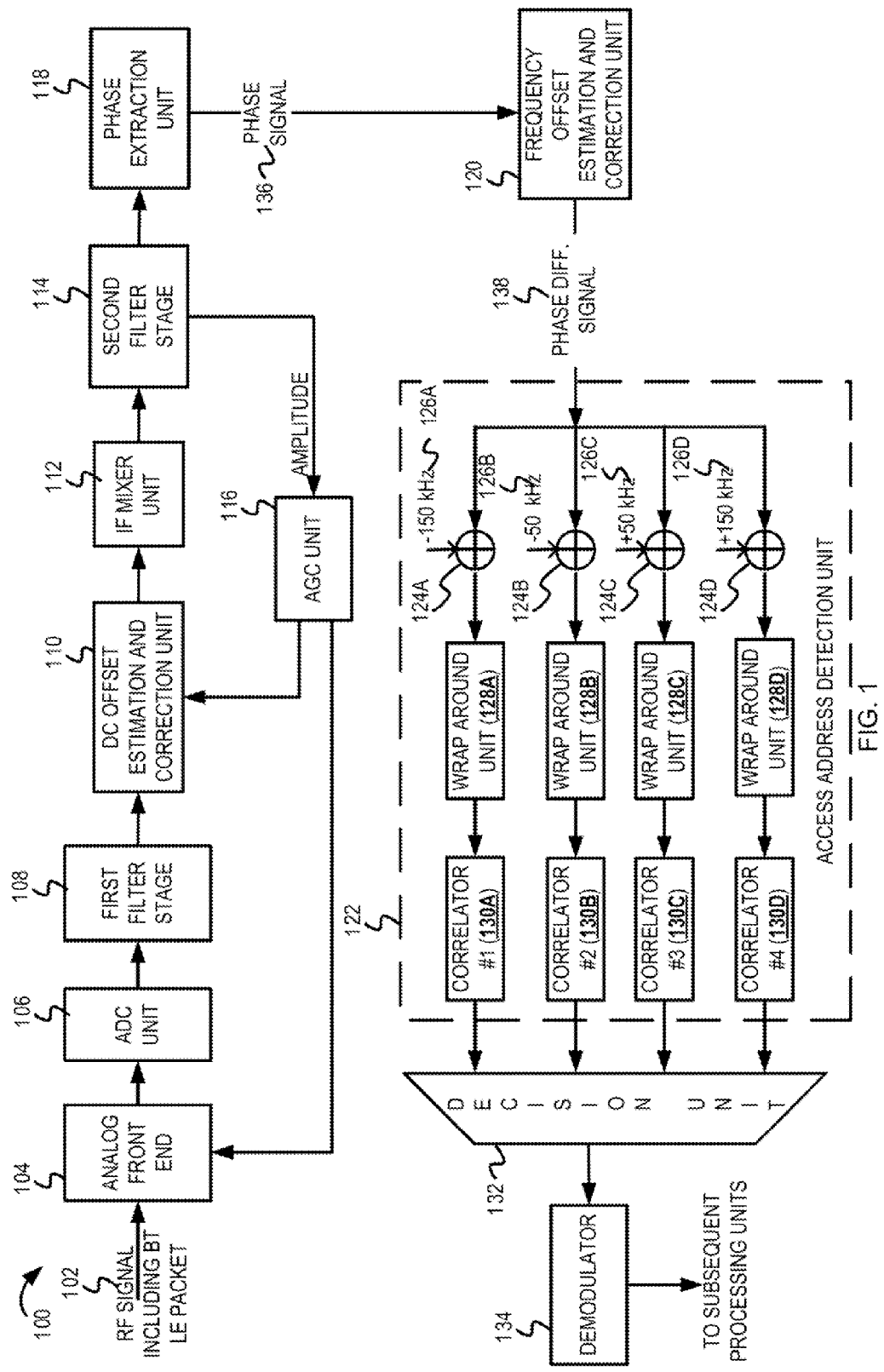
FIG. 1 is an example block diagram of a communication unit including a mechanism for access address decoding using multiple correlators.

The description that follows includes exemplary systems, methods, techniques, instruction sequences, and computer program products that embody techniques of the present inventive subject matter. However, it is understood that the described embodiments may be practiced without these specific details. For instance, although examples refer to techniques for detecting Bluetooth® communication devices, embodiments are not so limited. In other embodiments, various other devices and standards (e.g., wireless local area network (WLAN) devices, such as IEEE 802.11 compatible devices) can execute the device detection techniques described herein. In other instances, well-known instruction instances, protocols, structures, and techniques have not been shown in detail in order not to obfuscate the description.

A Bluetooth basic rate (BR) packet typically comprises a 4-bit preamble field, a 64-bit sync word field, a 4-bit trailer field, and a payload field. A Bluetooth low energy (LE) packet typically comprises an 8-bit preamble field, a 32-bit access address field, and a payload field. Before decoding the payload field, the Bluetooth device receiving an incoming packet ("receiving Bluetooth device") may need to identify the Bluetooth device that is transmitting the packet ("transmitting Bluetooth device") and to determine whether the incoming packet is intended for the receiving Bluetooth device. Therefore, prior to decoding the payload field, the receiving Bluetooth device may perform a correlation using the 32-bit access address field (for a Bluetooth LE packet communication). For example, with reference to the Bluetooth LE packet communication, a correlation may be performed between the 32-bit access address field in the incoming packet and one or more access addresses that were assigned to the corresponding one or more potential transmitting Bluetooth devices (e.g., other Bluetooth devices with which the receiving Bluetooth device has established a connection). However, for the Bluetooth LE packet communication, the Hamming distance (i.e., the number of positions at which the corresponding symbols are different) between access addresses assigned to different Bluetooth devices in a communication network is typically very small. In one example, the Hamming distance is 2 for a 32-bit access address. Therefore, a perfect (or almost perfect) correlation using the 32-bit access address in the received Bluetooth LE packet may be needed. Moreover, the modulation index associated with a Bluetooth LE packet may be much higher than the modulation index associated with a typical Bluetooth BR packet. In one example, the modulation index associated with the Bluetooth LE packet may be within the range of 0.45~0.55, while the modulation index associated with the Bluetooth BR packet may be within the range 0.28~0.35. This can result in a larger frequency swing (also known as a frequency offset) across symbols of the Bluetooth LE packet. In one example, the frequency offset associated with the Bluetooth LE packet may be +/−150 kHz (as opposed to a smaller +/−75 kHz frequency offset associated with the Bluetooth BR packet). Because the Bluetooth LE packet can have a large frequency offset, the bits of the access address field may not be properly decoded if the frequency offset is not removed prior to detection/decoding of the access address field. Furthermore, because the decoding (and correlation) of the access address field (of the Bluetooth LE packet) can be associated with strict constraints (e.g., a 32/32 correlation threshold), the access address field may fail the correlation (e.g., may not meet the correlation threshold) if the frequency offset is not removed prior to detection/decoding of bits in the access address field.

Existing techniques for decoding the access address field in the Bluetooth LE packet can rely on an automatic gain control (AGC) unit to first detect that a received RF signal comprises the Bluetooth LE packet. An initial portion of the preamble of the Bluetooth LE packet can be used (e.g., by the AGC unit) for detecting a gain increase (e.g., detecting a power jump event) and for subsequently triggering operations for frequency offset estimation. These existing access address decoding techniques typically wait for the in-band RF signal (e.g., a frequency swing associated with the RF signal) to settle (e.g., a setting time interval of typically 2-3 microseconds) and then utilize the remaining portion of the preamble for frequency offset estimation. For example, typically only an 8-microsecond time interval (e.g., the length of the Bluetooth LE packet preamble) may be available to estimate and correct the frequency offset before the access address field is received. In some instances, detecting the presence of a Bluetooth LE packet and waiting for the in-band signal to settle can consume more than the 8-microsecond time interval (i.e., the duration of the Bluetooth LE packet preamble). In other words, the duration of the Bluetooth LE packet preamble may not be sufficient to accurately estimate and correct the frequency offset. Furthermore, the setting time interval can vary depending on the communication channel, the presence of blockers, the analog-to-digital conversion process employed, and other such factors. Because the frequency offset estimation process may not be initiated until the settling time interval has elapsed, the settling time interval can further reduce the amount of time available for the existing techniques to estimate and correct the frequency offset. Also, it can be difficult to tune the AGC unit over a wide input signal range (e.g., −100 dBm to 0 dBm) during a short time interval.

In some embodiments, multiple correlators can be employed for access address decoding, as will be further described below with reference to FIGS. 1-3. A phase difference signal (determined from a received RF signal) can be provided to a plurality of access address decoding chains. In each of the access address decoding chains, a secondary frequency offset can be applied to the phase difference signal and the resultant compensated phase difference signal can be correlated against an access address associated with the communication device. The output of the correlators in each of the access address decoding chains can be compared against a correlation threshold. The access address decoding chain that comprises the correlator that meets the correlation threshold can be selected and the compensated phase difference signal associated with the selected access address decoding chain can be subsequently processed. Such a mechanism for employing multiple correlators for access address decoding can reduce the packet error rate, the amount of time consumed for packet decoding, and the number of operations executed to decode the access address (and ultimately, the received packets). This can improve the communication performance of the communication device.

FIG. 1 is an example block diagram of a communication unit 100 including a mechanism for access address decoding using multiple correlators. In some implementations, the communication unit 100 can be implemented within an electronic device with Bluetooth communication capabilities, such as a laptop computer, a tablet computer, a mobile phone, a smart appliance, a gaming console, an access point, a camera, a desktop computer, or other suitable electronic devices. The communication unit 100 can implement protocols and functionality to enable Bluetooth communication in a wireless communication network. In some embodiments, in addition to Bluetooth communication protocols, the communication unit 100 can implement other protocols and functionality to enable other types of communications (e.g., wireless local area network (WLAN), Ethernet, WiMAX, powerline communications, etc.). In some embodiments, the communication unit 100 may be implemented within a system-on-a-chip (SoC) or other type of integrated circuit (IC). Although not depicted in FIG. 1, the communication unit 100 can comprise a transmitter unit and a receiver unit. The receiver unit can comprise the processing components depicted in FIG. 1 and described herein.

In FIG. 1, the receiver unit of the communication unit 100 comprises an analog front end (AFE) 104. The AFE 104 is coupled with an analog to digital converter (ADC) 106 which, in turn is coupled with a first filter stage 108. The first filter stage 108 is coupled with a DC offset estimation and correction unit 110. The DC offset estimation and correction unit 110 is coupled with an intermediate frequency (IF) mixer unit 112. The IF mixer unit 112 is coupled with a second filter stage 114. The second filter stage 114 is coupled with a phase extraction unit 118 and an AGC unit 116. The output of the AGC unit 116 is fed back to the DC offset estimation and correction unit 110. The AGC unit 116 may also be coupled with the AFE 104 to perform gain sizing of RF signals received by the AFE 104. The output of the phase extraction unit 118 is provided to a frequency offset estimation and correction unit 120. The frequency offset estimation and correction unit 120 is coupled with an access address detection unit 122. The access address detection unit 122 is coupled with a decision unit 132 which, in turn, is coupled with a demodulator 134. In FIG. 1, the access address detection unit 122 comprises four processing paths referred to herein as "access address decoding chains." The first access address decoding chain comprises an adder 124A, a wrap-around unit 128A, and a correlator 130A. Likewise, the second access address decoding chain comprises an adder 124B, a wrap-around unit 128B, and a correlator 130B; the third access address decoding chain comprises an adder 124C, a wrap-around unit 128C, and a correlator 130C; and the fourth access address decoding chain comprises an adder 124D, a wrap-around unit 128D, and a correlator 130D. The output of each of the correlators 130A, 130B, 130C, and 130D is provided to the decision unit 132. The output of the decision unit 132 is provided to the demodulator 134. The output of the demodulator 134 is provided for subsequent processing by other processing components of the receiver unit (e.g., post processing filter units, post processing amplifiers, etc.).

An RF signal 102 including a Bluetooth LE packet is received at an antenna (not shown) of the Bluetooth LE communication unit 100. The RF signal 102 is provided to the AFE 104 via the antenna. In some embodiments, the RF signal 102 may be received via a network interface of the Bluetooth LE communication unit 100. For example, the RF signal 102 may be received at the network interface that couples the Bluetooth LE communication unit 100 and the antenna. The AFE 104 can comprise an impedance transformer, a low noise amplifier (LNA), a variable gain amplifier (VGA), one or more mixer units, other suitable amplifiers, one or more analog filters, and other suitable analog processing components. The output of the AFE 104 is provided to the ADC unit 106. The ADC unit 106 can convert the analog received RF signal 102 into its corresponding digital representation ("digital received signal"). In one example, the ADC unit 106 can be a cascaded sigma-delta analog to digital converter. In other examples, the ADC unit 106 can employ other suitable analog to digital conversion techniques. In some implementations, the digital received signal at the output of the ADC unit 106 can be 96 MHz. The output of the ADC unit 106 is provided to the first filter stage 108 to eliminate/minimize quantization noise, aliasing noise, and other interference in the digital received signal. In one implementation, the first filter stage 108 (also known as a front end filtering stage) can comprise a sinc filter and a finite impulse response (FIR) filter. The FIR filter may be a windowed linear-phase FIR digital filter (also known as an FIR1 filter). The first filter stage 108 may also comprise one or more other types of filters such as N-tap moving average filter (e.g., a 4-tap moving average filter). In some implementations, the first filter stage 108 can also implement functionality to down-sample the filtered digital received signal from 96 MHz to 8 MHz or to another suitable low frequency. The output of the first filter stage 108 is provided to the DC offset estimation and correction unit 110. In some embodiments, the DC offset estimation and correction unit 110 can comprise a first order infinite impulse response (IIR) filter or another suitable narrowband low pass filter. The filter coefficients of the IIR filter can be dynamically configured to control the bandwidth of the DC offset estimation and correction unit 110. The DC offset estimation and correction unit 110 (e.g., the IIR filter) can estimate the DC (i.e., 0 Hz) component of the digital received signal and can remove the estimated DC component from the digital received signal. Additionally, the DC offset estimation and correction unit 110 can also comprise a first-in first-out (FIFO) queue and a leaky bucket filter to regulate the flow of digital bits (e.g., the bits of the digital received signal) in the receiver unit.

In some implementations, after a change in the AGC gain is detected (e.g., by the AGC unit 116), a leaky bucket filter of the DC offset estimation and correction unit 110 can be enabled for DC tracking. A predetermined number of samples (e.g., 16 samples at an 8 MHz sampling rate) can be accumulated in the FIFO queue. In some embodiments, the leaky bucket filter, the IF mixer unit 112, and the second filter stage 114 may be temporarily disabled until the FIFO queuing unit has accumulated the predetermined number of samples. In some embodiments, the DC offset estimation and correction unit 110 may then be configured in a playback mode that operates at a 32 MHz sampling rate. In the playback mode, after the FIFO queue is full, the accumulated samples can be provided to the IF mixer unit 112 so that data rate at the output of the DC offset estimation and correction unit 110 is much faster than the data rate at the input of the DC offset estimation and correction unit 110. In one example, the data rate at the output (e.g., 32 MHz) of the DC offset estimation and correction unit 110 may be four times faster than the data rate at the input (e.g., 8 MHz) of the DC offset estimation and correction unit 110. The FIFO queue and faster playback can allow for more accurate DC offset estimation and clean DC offset cancellation, starting from the beginning of the data samples, which improves the performance of access address detection. Such a design implementation using the FIFO queue and faster playback can also help preserve the data samples for subsequent processing, which can be helpful for low energy (LE) operations because of the large frequency offset and stringent correlation threshold.

After the DC offset is subtracted from the digital received signal, the resultant signal is provided to the IF mixer unit 112. The IF mixer unit 112 can combine (e.g., perform convolution operations between) the digital received signal at the output of the DC offset estimation and correction unit 110 and a predetermined local oscillator signal. The IF mixer unit 112 can down-convert the digital received signal from an intermediate frequency to a baseband frequency. The output of the IF mixer unit 112 is provided to the second filter stage 114. In one implementation, the second filter stage 114 can comprise a 25-tap linear phase FIR filter. It is noted that in other implementations, the second filter stage 114 can comprise other suitable types of filters (e.g., an 11-tap linear phase FIR filter). The second filter stage 114 can be designed to suppress/eliminate high-pass interference.

The output of the second filter stage 114 is provided to the AGC unit 116. In some implementations, the processing components of the receiver unit (e.g., the IF mixer unit 112, the second filter stage 116, etc.) may have a smaller dynamic range than the input RF signal 102. Therefore, the AGC unit 116 can scale the digital received signal so that the dynamic range of the input RF signal 102 lies within the dynamic range limits of the subsequent processing components. As depicted in FIG. 1, the AGC unit 116 can operate in a feedback loop. The AGC unit 116 can receive the output of the second filter stage 114 (e.g., the AGC unit 116 can receive an amplitude or another parameter that is representative of the signal strength), determine the gain or attenuation that should be applied to the digital received signal, and accordingly scale the digital received signal. In one implementation, the second filter stage 114 can comprise at least two filter units—a first filter unit that is used to filter the output of the IF mixer unit 112 for the phase extraction unit 118 and a second filter unit that is used to filter the output of the IF mixer unit 112 for the AGC unit 116. In some implementations, to reduce AGC latency, the second filter unit may have a shorter filtering time and a shorter length (i.e., fewer number of taps) as compared to the first filter unit. The output of the second filter unit (with the shorter filter length) may be directly provided to the AGC unit 116 to enable faster gain control, faster AGC settling, and to consequently enable faster access address correlation. For example, the second filter stage 114 can comprise a 25-tap FIR filter unit and an 11-tap FIR filter unit. The 25-tap FIR filter unit can filter the output of the IF mixer unit 112 and can provide the resultant signal to the phase extraction unit 118. The 11-tap FIR filter unit can filter the output of the IF mixer unit 112 and can provide the resultant signal to the AGC unit 116.

The phase extraction unit 118 can determine the phase of the digital signal received from the second filter stage 114. In one embodiment, the phase extraction unit 118 can comprise a coordinate rotation digital computer (CORDIC). The CORDIC can convert the digital received signal from rectangular coordinates (e.g., from an in-phase/quadrature signal representation) into polar coordinates to yield a magnitude and phase of the digital received signal. The phase of the digital received signal ("phase signal") 136 can be used to subsequently compute the frequency offset estimate and to decode the access address field. It is noted that in a non-LE operating mode (e.g., a Bluetooth basic rate (BR) operating mode), the amplitude of the digital received signal may be used by the AGC unit 116 to calculate the in-band signal power for gain adjustment.

The phase signal 136 at the output of the phase extraction unit 118 is provided to the frequency offset estimation and correction unit 120. In one embodiment, the frequency offset estimation and correction unit 120 can comprise a 4-sample offset phase difference unit, an 8-sample offset phase difference unit, and a frequency tracking unit. The phase signal 136 generated by the phase extraction unit 118 can be provided to the 4-sample offset phase difference unit and to the 8-sample offset phase difference unit. The 8-sample offset phase difference unit can generate an 8-sample offset phase difference signal by subtracting the phase of samples that are separated by 8 intermediate samples. For example, a first bit of the 8-sample offset phase difference signal can be determined by subtracting the $9^{th}$ sample of the phase signal 136 and the $1^{st}$ sample of the phase signal 136. The second bit of the 8-sample offset phase difference signal can be determined by subtracting the $10^{th}$ sample of the phase signal 136 and the $2^{nd}$ sample of the phase signal 136, and so on. The phase difference signal (Phase_diff_8_Offset) generated by the 8-sample offset phase difference unit can be generically expressed by Eq. 1, where phase_signal is the phase signal 136 at the output of the phase extraction unit 118.

$$\text{Phase\_diff\_8\_Offset} = \text{phase\_signal}(9\text{:end}) - \text{phase\_signal}(1\text{:end}-8) \quad \text{Eq 1}$$

Likewise, the 4-sample offset phase difference unit can generate a 4-sample offset phase difference signal by subtracting the phase of samples that are separated by 4 intermediate samples. The difference between the output of the 4-sample offset phase difference unit and the output of the 8-sample offset phase difference unit can be determined. This can be equivalent to removing a frequency offset associated with the digital received signal. In some implementations, the frequency offset estimation and correction unit 120 can comprise a frequency tracking unit to ensure that the frequency offset estimated (over multiple iterations) converges to the actual frequency offset. In some implementations, the frequency offset estimation and correction unit 120 can also comprise other suitable filter units (e.g., an infinite impulse response low pass filter) to remove residual frequency offsets. The resultant phase difference signal 138 is provided to the access address detection unit 122 for decoding the access address in the received Bluetooth LE packet, determining whether the Bluetooth LE packet is intended for the communication device, and identifying the Bluetooth device that transmitted the Bluetooth LE packet.

As described above, the access address can identify a pair of communicating devices (e.g., a transmitting Bluetooth device and a receiving Bluetooth device) that have established a communication link. Thus, the access address received in a Bluetooth LE packet can uniquely identify the Bluetooth device that transmitted the Bluetooth LE packet and can also indicate whether the Bluetooth LE packet 150 is intended for the receiving Bluetooth device. As will be further described below, the access address detection unit 122 can employ a plurality of correlators to quickly identify the Bluetooth device that transmitted the Bluetooth LE packet. With reference to FIG. 1, each processing path within the access address detection unit 122 (referred to herein as an "access address decoding chain") is associated with a predetermined secondary frequency offset. The secondary frequency offset may be selected to compensate for any estimation errors that may be encountered by the frequency offset estimation and correction unit 120 in dynamically estimating the frequency offset associated with the received Bluetooth LE packet. In one example, to analyze a frequency span of +/−200 kHz (e.g., a 400 kHz frequency band) within the Bluetooth 2.4 GHz operating frequency using four access address decoding chains, the secondary frequency offsets may be selected as −150 kHz, −50 kHz, 50 kHz, and 150 kHz. The frequency offsets −150 kHz, −50 kHz, 50 kHz, and 150 kHz may be respectively associated with the first, the second, the third, and the fourth access address decoding chains of the access address detection unit 122. The phase difference signal 138 at the output of the frequency offset estimation and correction unit 120 is provided as one input to the adders 124A, 124B, 124C, and 124D. The other input to the adders 124A, 124B, 124C, and 124D is a secondary frequency offset signal 126A, 126B, 126C, and 126D respectively. With reference to the example of FIG. 1, a −150 kHz secondary frequency offset signal (126A) is provided to the adder 124A, a −50 kHz secondary frequency offset signal (126B) is provided to the adder 124B, a 50 kHz secondary frequency offset signal (126C) is provided to the adder 124C, and a 150 kHz secondary frequency offset signal (126D) is provided to the adder 124D. The adders 124A, 124B, 124C, and 124D apply the corresponding secondary frequency offset 126A, 126B, 126C, and 126D to the phase difference signal 138. Thus, for each access address decoding chain, the total frequency offset applied to the phase difference signal 138 is the frequency offset ($\Delta f$) determined by the frequency offset estimation and correction unit 120 and the secondary frequency offset associated with the access address decoding chain. For example, the total frequency offset applied to the phase difference signal 138 in the first access address decoding chain that comprises the adder 124A is ($\Delta f$−150 kHz). It should be understood that in some embodiments, the secondary frequency offsets can be predetermined frequency offsets that are selected based on the number of access address decoding chains and the frequency range that is to be analyzed. In other embodiments, the secondary frequency offsets may be configurable using suitable techniques.

The output of the adders 124A, 124B, 124C, and 124D is provided to the wraparound units 128A, 128B, 128C, and 128D respectively. The wraparound units 128A, 128B, 128C, and 128D can be configured to ensure that symbols of the phase difference signal 138 do not exceed predetermined limits within which the corresponding subsequent correlators 130A, 130B, 130C, and 130D are configured to operate. For example, the correlators 130A, 130B, 130C, and 130D can be configured to operate within the range from $-\pi$ to $+\pi$ (i.e., −180 degrees to +180 degrees). Accordingly, the wraparound units 128A, 128B, 128C, and 128D can ensure that the symbols of the phase difference signal 138 lie within (i.e., do not fall below or exceed) the range $-\pi$ to $+\pi$. If, for any of the access address decoding chains, the symbols of the phase difference signal 138 fall outside the specified range, the wraparound unit associated with that access address decoding chain may add a value of $2\pi$ (i.e., 360 degrees) to bring the symbols of the phase difference signal 138 within the specified range. It should be noted that the correlators 130A, 130B, 130C, and 130D may be configured to operate within other suitable ranges and their corresponding wrap-around units 128A, 128B, 128C, and 128D can ensure that the symbols of the phase difference signal 138 lie within those ranges.

The output of the wraparound units 128A, 128B, 128C, and 128D is provided to the correlators 130A, 130B, 130C, and 130D respectively. The correlators 130A, 130B, 130C, and 130D can correlate the compensated phase difference signal 138 against a predetermined access address associated with the communication device. In some embodiments, the correlators 130A, 130B, 130C, and 130D can be 32-bit access code correlators that are designed for correlating the 32-bits of access address (of the Bluetooth LE packet) in parallel. In some embodiments, each symbol of the phase difference signal 138 can be compared against a corresponding symbol of the predetermined access address. In some embodiments, the output of each correlator 130A, 130B, 130C, and 130D can indicate a number of matching symbols (e.g., a number of symbols of the phase difference signal 138 that matched the corresponding symbol of the predetermined access address). In other embodiments, the output of each correlator 130A, 130B, 130C, and 130D can indicate a number of symbols of the phase difference signal 138 that did not match the corresponding symbol of the predetermined access address. With reference to the embodiment, where the correlators 130A, 130B, 130C, and 130D indicate the number of matched symbols, if a correlator generates a 30/32 output, it indicates that out of 32 symbols, the phase difference signal 138 and the predetermined access address had 30 matching symbols. The output of the correlators 130A, 130B, 130C, and 130D can then be compared to a correlation threshold (e.g., a 32/32 correlation threshold) to identify one of the access address decoding chains that complies with the correlation threshold. In some embodiments, as depicted in FIG. 1, the decision unit 132 (e.g., a multiplexer) can perform this comparison. In other embodiments, each of the correlators 130A, 130B, 130C, and 130D can perform this comparison and can indicate whether their correlator output satisfies the correlation threshold. If the output of the correlator (e.g., the correlator 130A) meets the correlation threshold, the compensated phase difference signal processed by that correlator 130A is deemed to comprise the requisite access address. Accordingly, the phase difference signal that was processed by the correlator 130A is provided for subsequent demodulation (e.g., to the demodulator 134). As an example, the correlator 130A may generate a 32/32 correlation output, the correlators 130B and 130C may generate a 30/32 correlation output, and the correlator 130D may generate a 29/32 correlation output. If the correlation threshold is 32/32, it may be determined that only the correlator 130A has met the correlation threshold. Accordingly, the compensated phase difference signal processed by the correlator 130A can be provided for subsequent demodulation. Subsequently received signals (e.g., comprising Bluetooth LE data packets) may be processed by the first access address decoding chain that comprises the correlator 130A, the corresponding adder 126A, and wraparound unit 128A. The other access address decoding chains may be disabled. In some embodiments, if more than one correlator satisfies the correlation threshold (e.g., if the correlators 130A, 130B meet the 31/32 correlation threshold), the decision unit 132 can select one of the access address decoding chains with the highest correlation output. In some embodiments, if more than one correlator satisfies the correlation threshold (e.g., if the correlators 130A, 130B meet the 32/32 correlation threshold), the decision unit 132 can randomly select one of the access address decoding chains. In some embodiments, if none of the correlators 130A, 130B, 130C, and 130D meets the correlation threshold, the received Bluetooth LE packet can be discarded.

After access code decoding operations, the phase difference signal is provided to the demodulator 134 to decode the Bluetooth LE packets. In some implementations, Bluetooth LE packets may be modulated using Gaussian frequency shift keying (GFSK) modulation schemes; therefore, the demodulator 134 may be a GFSK demodulator. It is noted that in other embodiments, the demodulator 134 may employ other suitable demodulation techniques depending on the modulation techniques employed by the transmitting Bluetooth device. In some implementations, prior to demodulation, the phase difference signal can be down-sampled (e.g., to yield a 1 MHz phase difference signal, a 2 MHz phase difference signal, etc.). In some implementations, the down-sampled phase difference signal may be filtered (e.g., using a Gaussian filter) to minimize inter-symbol interference. The demodulator 134 can then determine the data symbols that were received in the Bluetooth LE packet ("received data symbols"). In some implementations, the demodulator 134 can determine the received data symbols based on the sign of the symbols of the phase difference signal. In another implementation, the demodulator 134 can employ maximum likelihood detection techniques to determine the received data symbols. In some embodiments, the received data symbols can be further processed by one or more suitable post-processing units (e.g., amplifiers, filters, etc.).

Figure 2:
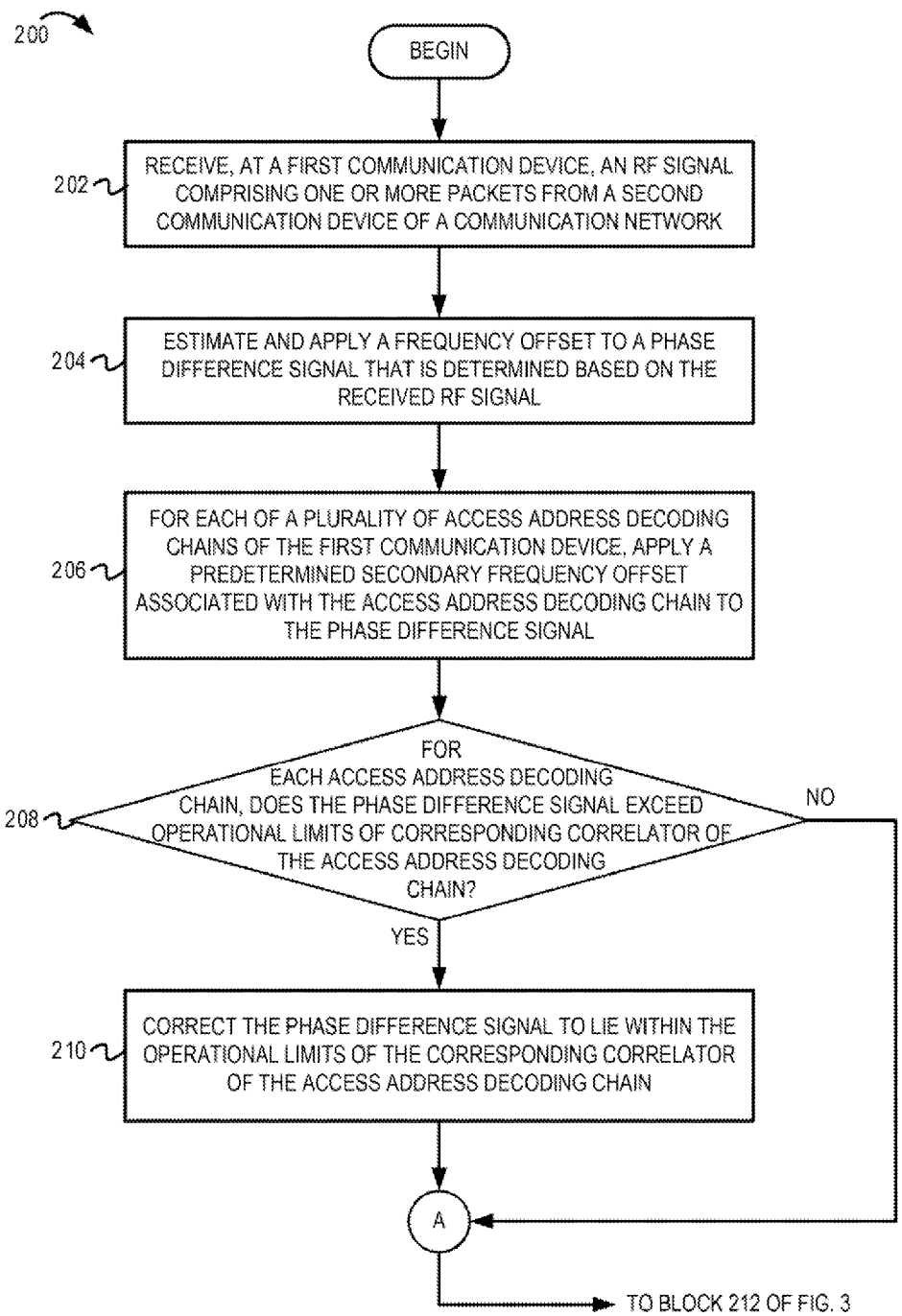
FIG. 2 is a flow diagram illustrating example operations for access address decoding using multiple correlators.
Figure 3:
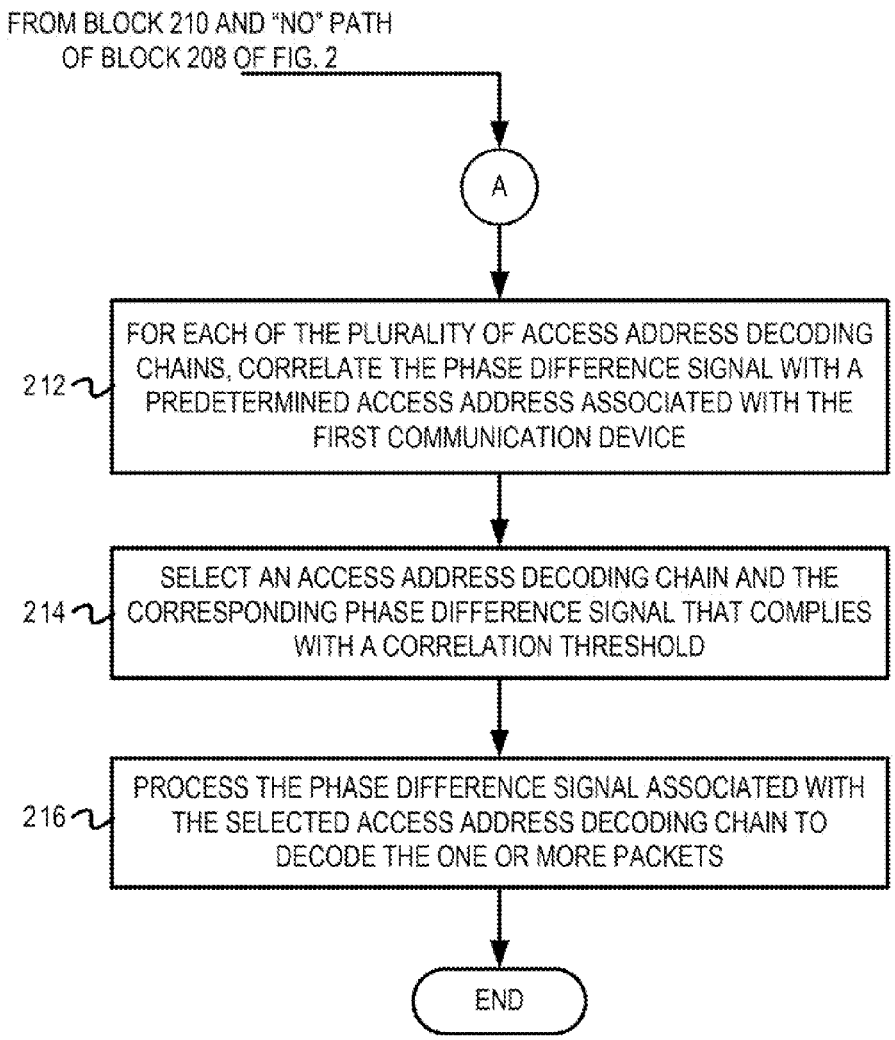
FIG. 3 is a continuation of FIG. 2 and also illustrates example operations for access address decoding using multiple correlators.

FIG. 2 and FIG. 3 depict a flow diagram ("flow") 200 illustrating example operations for access address decoding using multiple correlators. The flow 200 will be described with reference to the block diagram of FIG. 1. The flow 200 begins at block 202 in FIG. 2.

At block 202, a first communication device of a communication network receives an RF signal comprising one or more packets from a second communication device of the communication network. With reference to the example of FIG. 1, the Bluetooth communication unit 100 can receive the RF signal 102 including one or more Bluetooth LE packets from another Bluetooth device at the analog front end 104 of the Bluetooth communication unit 100. As described above with reference to FIG. 1, the received RF signal 102 can be amplified, filtered, converted from the analog domain into the frequency domain, etc. Additionally, the DC offset associated with the received RF signal 102 can be corrected and the RF signal 102 can be down-sampled and down-converted. It should be noted that the received RF signal 102 can be subject to other pre-processing operations in the analog domain or the digital domain. The flow continues at block 204.

At block 204, a frequency offset is estimated and applied to a phase difference signal that is determined based on the received RF signal. For example, the frequency offset estimation and correction unit 120 can estimate and apply the frequency offset to the phase difference signal. In one embodiment, as described above with reference to FIG. 1, the phase extraction unit 118 can determine the phase (e.g., using a CORDIC) of the pre-processed RF signal (determined at block 202) to yield the phase signal 136. The frequency offset estimation and correction unit 120 can comprise one or more phase difference units and can determine a phase difference signal 138 from the phase signal 136, as described above with reference to FIG. 1. The phase difference signal 138 can have a four sample offset, an eight sample offset, or other suitable number of sample offsets. The frequency offset estimation and correction unit 120 can also comprise a frequency tracking unit to ensure that the frequency offset estimated (over multiple iterations) converges to the actual frequency offset. The flow continues at block 206.

At block 206, for each of a plurality of access address decoding chains of the first communication device, a predetermined secondary frequency offset associated with the access address decoding chain is applied to the phase difference signal. For example, the access address detection unit 122 can apply a predetermined secondary frequency offset associated with each access address decoding chain to the phase difference signal 138. In one example, as described above with reference to FIG. 1, the access address detection unit 122 can comprise four access address decoding chains. The secondary frequency offsets −150 kHz, −50 kHz, 50 kHz, and 150 kHz may be respectively associated with the first, the second, the third, and the fourth access address decoding chains of the access address detection unit 122. In some embodiments, the secondary frequency offset associated with each of the access address decoding chains may be predetermined. In another embodiment, the secondary frequency offset associated with each of the access address decoding chains may be dynamically determined and may be configurable. After the secondary frequency offset associated with each of the access address decoding chains are applied to the phase difference signal 138, the flow continues at block 208.

At block 208, it is determined, for each of the plurality of access address decoding chains, whether the phase difference signal exceeds operational limits associated with a corresponding correlator of the access address decoding chain. For example, each of the access address decoding chains can comprise a wraparound unit that can determine whether the phase difference signal exceeds operational limits associated with a corresponding correlator of the access address decoding chain. As described above with reference to the example of FIG. 1, wraparound units 128A, 128B, 128C, and 128D can ensure that symbols of the phase difference signal (at each of the respective access address decoding chains) do not exceed predetermined limits within which the corresponding subsequent correlators 130A, 130B, 130C, and 130D are configured to operate. If it is determined, for any of the plurality of access address decoding chains, that the phase difference signal exceeds the operational limits associated with the corresponding correlator of the access address decoding chain, the flow continues at block 210. Otherwise, if it is determined, for each of the plurality of access address decoding chains, that the phase difference signal is within the operational limits associated with the corresponding correlator of the access address decoding chain, the flow continues at block 212 of FIG. 3.

At block 210, the phase difference signal is corrected to lie within the operational limits associated with the corresponding correlator of the access address decoding chain. For example, after the wraparound unit (e.g., the wrap around unit 128A) determines that the phase difference signal exceeds the operational limits (e.g., $-\pi$ to $+\pi$) associated with the corresponding correlator 130A of the access address decoding chain, the wraparound unit 128A can add a value of $2\pi$ to the phase difference signal so that the phase difference signal now lies within the operational limits associated with the corresponding correlator 130A of the access address decoding chain. The flow then continues at block 212 of FIG. 3.

At block 212, for each of the plurality of access address decoding chains, the phase difference signal is correlated with a predetermined access address associated with the first communication device. For example, each of the access address decoding chains can comprise a correlator that can correlate the phase difference signal with the predetermined access address associated with the first communication device. As described above with reference to the example of FIG. 1, the correlators 130A, 130B, 130C, and 130D can correlate the phase difference signal with the predetermined access address and can determine a number of symbols of the phase difference signal that do not match the corresponding symbol of the predetermined access address. For example, an output of 30/32 can indicate of the 32 symbols (e.g., if the predetermined access address has 32 symbols), the phase difference signal and the predetermined access address had 30 matching symbols. The flow continues at block 214.

At block 214, an access address decoding chain and the corresponding compensated phase difference signal that complies with a correlation threshold is selected from the plurality of access address decoding chains. For example, the decision unit 132 can compare the outputs of the correlators 130A, 130B, 130C, and 130D against the correlation threshold. The decision unit 132 can identify one of the correlators that is associated with a correlation output that is greater than or equal to the correlation threshold. The decision unit 132 can select the access address decoding chain and the corresponding compensated phase difference signal that corresponds to the identified correlator. The flow continues at block 216.

At block 216, the phase difference signal associated with the selected access address decoding chain is processed to decode the one or more packets. For example, the demodulator 134 can use GFSK demodulation techniques to decode the Bluetooth LE packets that constitute the received RF signal 102 and to extract the data symbols. From block 216, the flow ends.

It should be understood that FIGS. 1-3 and the operations described herein are examples meant to aid in understanding embodiments and should not be used to limit embodiments or limit scope of the claims. Embodiments may perform additional operations, fewer operations, operations in a different order, operations in parallel, and some operations differently. For instances, although in some embodiments the correlation threshold can be 32/32 (i.e., a perfect correlation), it is noted that in other embodiments the correlation threshold can be 31/32 (or another suitable correlation threshold, e.g., depending on the Hamming distance).

In some implementations, the operations of each of the access address decoding chains (including an adder, a corresponding wraparound unit, and a corresponding correlator) can be executed concurrently. In other implementations, the operations of each of the access address decoding chains can be executed sequentially. Furthermore, although FIG. 1 describes all the correlators 130A, 130B, 130C, and 130D being configured to operate within the range from $-\pi$ to $+\pi$, embodiments are not so limited. In other embodiments, the operating range of each correlator (or subsets of the correlators) may be different. Although FIG. 1 depicts the that access address decoding chains are associated with the secondary frequency offsets 150 kHz, −50 kHz, 50 kHz, and 150 kHz, embodiments are not so limited. In other embodiments, other suitable secondary frequency offsets can be applied to the phase difference signal 138 at each of the access address decoding chains. In some implementations, the secondary frequency offset may not be applied to the phase difference signal 138 in one or more of the access address decoding chains. Furthermore, any suitable number (two or more) of access address decoding chains can be implemented and the secondary frequency offset associated with each of the access address decoding chains can be determined accordingly. For example, seven access address decoding chains may be implemented to analyze a 420 kHz frequency band of uncertainty. The size of each frequency bin within the 420 kHz frequency band of uncertainty can be calculated to be 420 KHz/7=60 kHz. Consequently, {−180 kHz, −120 kHz, −60 kHz, 0 kHz, 60 kHz, 120 kHz, 180 kHz} can be selected as the secondary frequency offsets.

In some embodiments, after the AGC unit 116 detects that the incoming RF signal 102 comprises a packet (e.g., based on detecting a signal jump or an increase in the strength of the incoming RF signal 102), the AGC unit 116 can provide control signals to enable one or more subsequent processing units. For example, the AGC unit 116 can provide a control signal to enable the frequency offset estimation and correction unit 120 and to prompt the frequency offset estimation and correction unit 120 to begin tracking and estimating the frequency offset. As another example, the AGC unit 116 can provide a control signal to enable the access address detection unit 122 (or one or more components of the access address detection unit).

Lastly, in some embodiments, a Bluetooth basic rate and extended data rate (BR/EDR) communication unit can share functionality (e.g., one or more processing units) with the Bluetooth LE communication unit 100. For example, the Bluetooth BR communication unit may comprise two 64-bit access code correlators for decoding a 64-bit BR/EDR access code in parallel. The Bluetooth LE communication unit 100 can utilize the two 64-bit correlators as four 32-bit correlators to decode the 32-bit LE access address in parallel. In some embodiments, the Bluetooth BR/EDR communication unit and the Bluetooth LE communication unit 100 may also share other processing components such as an analog front end, filter units, amplifier units, memory modules, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions (e.g., executable by one or more processing units). In addition, machine-readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
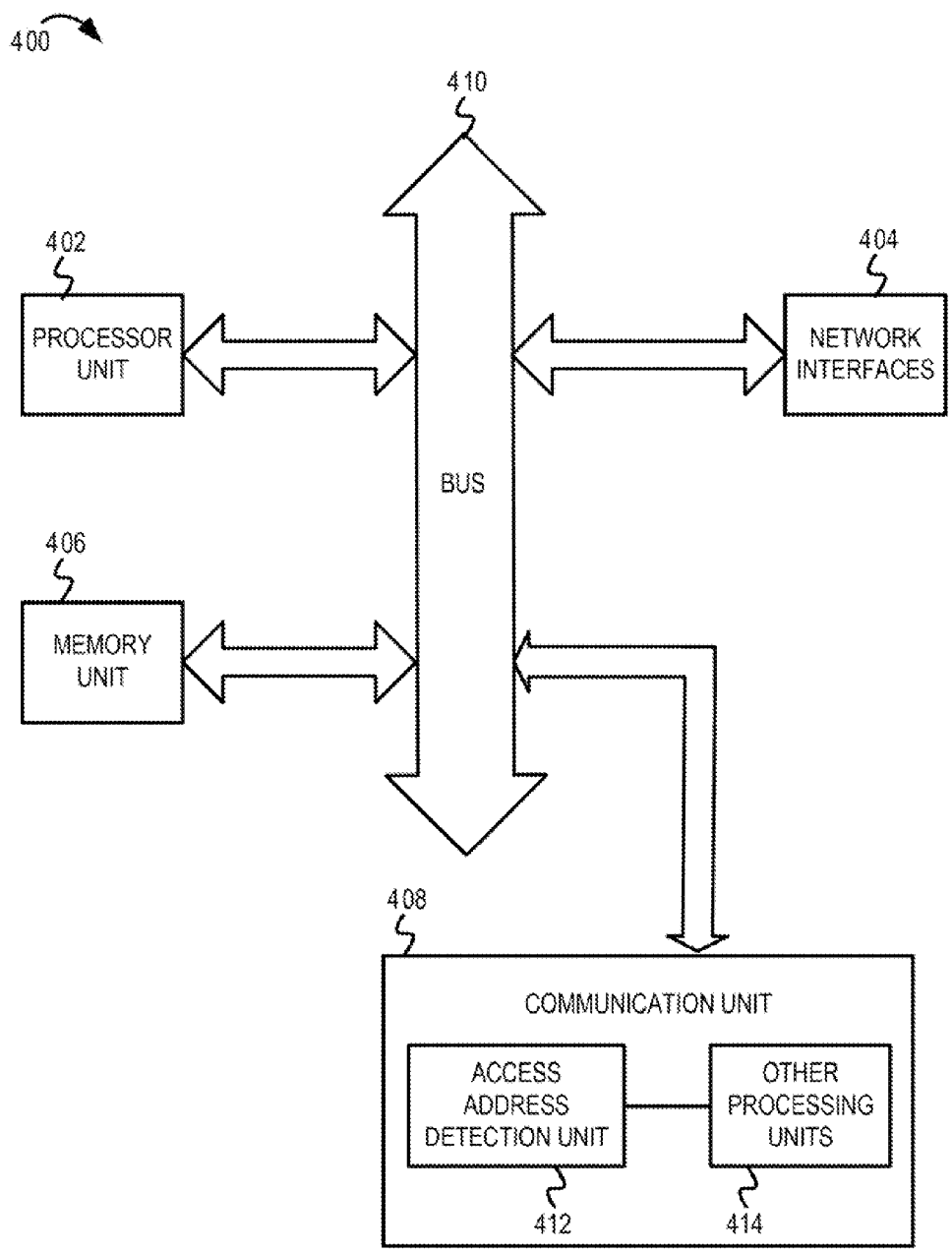
FIG. 4 is a block diagram of one embodiment of an electronic device including a mechanism for access address decoding using multiple correlators.

FIG. 4 is a block diagram of one embodiment of an electronic device 400 including a mechanism for access address decoding using multiple correlators. In some implementations, the electronic device 400 may be one of a notebook computer, a desktop computer, a tablet computer, a netbook, a mobile phone, a gaming console, a personal digital assistant (PDA), or other electronic systems comprising device communication unit with wireless (or wired) communication capabilities (e.g., Bluetooth communication capabilities). The electronic device 400 includes a processor unit 402 (possibly including multiple processors, multiple cores, multiple nodes, and/or implementing multi-threading, etc.). The electronic device 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 400 also includes a bus 410 (e.g., PCI, ISA, PCI-Express, HyperTransport®, Infini-Band®, NuBus, AHB, AXI, etc.), and network interfaces 404 that include at least one of a wireless network interface (e.g., a Bluetooth interface, a WLAN 802.11 interface, a WiMAX interface, a ZigBee® interface, a Wireless USB interface, etc.) and a wired network interface (e.g., an Ethernet interface, a powerline communication interface, etc.).

The electronic device 400 also includes a communication unit 408. The communication unit 408 comprises an access address detection unit 412 and other processing units 414. The access address detection unit 412 (in conjunction with the other processing units 414) can employ a plurality of access address decoding chains to apply a suitable secondary frequency offset to a phase difference signal (generated based on a received RF signal) and to decode the access address in a received packet, as described above with reference to FIGS. 1-3. Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). The processor unit 402, the memory unit 406, and the network interfaces 406 are coupled to the bus 410. Although illustrated as being coupled to the bus 410, the memory unit 406 may be coupled to the processor unit 402.

While the embodiments are described with reference to various implementations and exploitations, it will be understood that these embodiments are illustrative and that the scope of the inventive subject matter is not limited to them. In general, techniques for using multiple correlators for communication device detection as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A method comprising:
receiving, at a first communication device, a radio frequency (RF) signal comprising a packet from a second communication device;
at each access address decoding chain of a first access address decoding chain and a second access address decoding chain of the first communication device, applying a first frequency offset associated with the access address decoding chain to a phase difference signal determined from the RF signal, correlating the phase difference signal with a predetermined access address associated with the first communication device to yield a correlation result, wherein the correlating comprises comparing each symbol of the phase difference signal against a corresponding symbol of the predetermined access address and determining a number of matching symbols;

determining that the correlation result associated with the first access address decoding chain exceeds the a correlation threshold; and demodulating the packet based, at least in part, on the phase difference signal after applying the first frequency offset associated with the first access address decoding chain.

2. The method of claim 1, wherein the first communication device includes four access address decoding chains, wherein each access address decoding chain of the four access address decoding chains includes a corresponding correlator.

3. The method of claim 1, further comprising:

at each of the first access address decoding chain and the second access address decoding chain, determining, after applying the first frequency offset, whether the phase difference signal lies within a predetermined phase threshold associated with a correlator of the access address decoding chain; and applying a correction to the phase difference signal to cause the phase difference signal to lie within the predetermined phase threshold in response to determining that the phase difference signal does not lie within the predetermined phase threshold, wherein said correlating the phase difference signal with the predetermined access address is in response to said applying the correction to the phase difference signal.

4. The method of claim 3, wherein at each of the first access address decoding chain and the second access address decoding chain, said determining whether the phase difference signal lies within the predetermined phase threshold associated with the correlator of the access address decoding chain comprises determining whether the phase difference signal lies within a range of −180 degrees and +180 degrees; and said applying the correction to the phase difference signal comprises adding +360 degrees to the phase difference signal in response to said determining that the phase difference signal does not lie within the range of −180 degrees and +180 degrees.

5. The method of claim 1, wherein the first communication device and the second communication device implement a Bluetooth communication protocol, wherein the packet is generated in accordance with a Bluetooth low energy (LE) communication protocol.

6. The method of claim 1, further comprising:

at each of the first access address decoding chain and the second access address decoding chain, comparing the number of matching symbols against the correlation threshold.

7. The method of claim 6, wherein said determining that the first access address decoding chain generated the correlation result that exceeds the correlation threshold comprises:

for the first access address decoding chain, determining that the number of matching symbols exceeds to the correlation threshold; and for the second access address decoding chain, determining that the number of matching symbols does not exceed the correlation threshold.

8. The method of claim 1, wherein the first frequency offset associated with the first access address decoding chain and the second access address decoding chain is based, at least in part, on one of a number of access address decoding chains associated with the first communication device and a communication frequency range being analyzed.

9. The method of claim 1, further comprising applying a second frequency offset to the phase difference signal, wherein the second frequency offset is applied prior to the first frequency offset.

10. The method of claim 1, further comprising:

at each of the first access address decoding chain and the second access address decoding chain, determining, after applying the first frequency offset, whether the phase difference signal lies within a predetermined phase threshold associated with a correlator of the access address decoding chain; and wherein the correlating the phase difference signal with the predetermined access address is in response to determining that the phase difference signal lies within the predetermined phase threshold.

11. A first communication device comprising:

a network interface operable to:

receive a radio frequency (RF) signal comprising a packet from a second communication device;

an access address detection unit coupled with the network interface, the access address detection unit comprising a first access address decoding chain and a second access address decoding chain, wherein, at each access address decoding chain of the first access address decoding chain and the second access address decoding chain, the access address detection unit is configured to:

apply a first frequency offset associated with the access address decoding chain to a phase difference signal determined from the RF signal, correlate the phase difference signal with a predetermined access address associated with the first communication device to yield a correlation result, wherein the correlation result is based, at least in part, on comparing each symbol of the phase difference signal against a corresponding symbol of the predetermined access address and determining a number of matching symbols; and the access address detection unit is configured to determine that the correlation result associated with the first access address decoding chain exceeds a correlation threshold.

12. The first communication device of claim 11, further comprising a demodulation unit coupled with the access address detection unit, the demodulation unit operable to demodulate the packet based, at least in part, on the phase difference signal after applying the first frequency offset associated with the first access address decoding chain.

13. The first communication device of claim 11, wherein each of the first access address decoding chain and the second access address decoding chain comprises an adder and a correlator, wherein the adder is operable to apply the first frequency offset associated with the access address decoding chain to the phase difference signal, and wherein the correlator is operable to correlate the phase difference signal with the predetermined access address.

14. The first communication device of claim 11, wherein each of the first access address decoding chain and the second access address decoding chain comprise a wrap around unit operable to:
  determine, after the first frequency offset is applied, whether the phase difference signal lies within a predetermined phase threshold associated with a correlator of the access address decoding chain;
  apply a correction to the phase difference signal to cause the phase difference signal to lie within the predetermined phase threshold in response to determining that the phase difference signal does not lie within the predetermined phase threshold; and
  provide the phase difference signal to the correlator for correlating the phase difference signal with the predetermined access address in response to applying the correction to the phase difference signal.

15. The first communication device of claim 11, wherein the first communication device and the second communication device are configured to implement a Bluetooth protocol, wherein the packet is generated in accordance with a Bluetooth low energy (LE) communication protocol.

16. The first communication device of claim 11, wherein each of the first access address decoding chain and the second access address decoding chain are operable to:
  compare the number of matching symbols against the correlation threshold.

17. The first communication device of claim 16, wherein the access address detection unit is operable to:
  for the first access address decoding chain, determine that the number of matching symbols exceed the correlation threshold; and
  for the second access address decoding chain, determine that the number of matching symbols does not exceed the correlation threshold.

18. The first communication device of claim 11, further comprising:
  an analog to digital converter (ADC) unit operable to convert an analog representation of the RF signal to a digital representation of the RF signal;
  a DC offset estimation and correction unit coupled with the ADC unit, the DC offset estimation and correction unit operable to determine a DC level associated with the digital representation of the RF signal and to compensate for the DC level associated with the digital representation of the RF signal;
  a filter stage coupled with the DC offset estimation and correction unit, the filter stage operable to filter a frequency component of the digital representation of the RF signal;
  a phase extraction unit coupled with the filter stage, the phase extraction unit operable to determine a phase signal based, at least in part, on the digital representation of the RF signal filtered by the filter stage; and
  a frequency offset estimation unit coupled with the phase extraction unit, the frequency offset estimation unit operable to determine the phase difference signal based, at least in part, on the phase signal determined by the phase extraction unit.

19. The first communication device of claim 18,
wherein the filter stage comprises a first filtering unit and a second filtering unit,
wherein the first filtering unit of the filter stage is operable to filter the frequency component of the digital representation of the RF signal and provide a first filtered signal to the phase extraction unit, and
wherein the second filtering unit of the filter stage is operable to filter the frequency component of the digital representation of the RF signal and provide a second filtered signal to an automatic gain control (AGC) unit of the first communication device, wherein a filter length of the first filtering unit is smaller than a filter length of the second filtering unit.

20. The first communication device of claim 18,
wherein the DC offset estimation and correction unit comprises a data queue,
wherein the DC offset estimation and correction unit is operable to:
  accumulate a predetermined number of samples of the packet of the RF signal in the data queue, wherein the samples at an input of the data queue are associated with a first data rate; and
  in response to determining that the data queue is filled, provide the samples from the data queue to the filter stage at a second data rate, wherein the second data rate associated with the samples at an output of the data queue is greater than the first data rate.

21. The first communication device of claim 11, further comprising a frequency offset estimation unit coupled with the network interface, the frequency offset estimation unit configured to apply a second frequency offset to the phase difference signal, wherein the second frequency offset is applied prior to the first frequency offset.

22. The first communication device of claim 11, wherein each of the first access address decoding chain and the second access address decoding chain comprises a wraparound unit operable to:
  determine, after the first frequency offset is applied, whether the phase difference signal lies within a predetermined phase threshold associated with a correlator of the access address decoding chain; and
  provide the phase difference signal to the correlator for correlating the phase difference signal with the predetermined access address in response to determining that the phase difference signal lies with the predetermined phase threshold.

23. A non-transitory machine-readable storage media having instructions stored therein, which when executed by a processor causes the processor to perform operations that comprise:
  receiving a radio frequency (RF) signal comprising a packet at a first communication device and from a second communication device of a communication network;
  at each access address decoding chain of a first access address decoding chain and a second access address decoding chain of the first communication device,
    applying a first frequency offset associated with the access address decoding chain to a phase difference signal determined from the RF signal,
    correlating the phase difference signal with a predetermined access address associated with the first communication device to yield a correlation result, wherein the correlating the phase difference signal comprises comparing each symbol of the phase difference signal against a corresponding symbol of the predetermined access address and determining a number of matching symbols;
  determining that the correlation result associated with the first access address decoding chain exceeds a correlation threshold; and demodulating the packet based, at least in part, on the phase difference signal after applying the first frequency offset associated with the first access address decoding chain.

24. The non-transitory machine-readable storage media of claim 23, wherein the operations further comprise:
at each of the first access address decoding chain and the second access address decoding chain,
determining, after applying first frequency offset, whether the phase difference signal lies within a predetermined phase threshold associated with a correlator of the access address decoding chain;
applying a correction to the phase difference signal to cause the phase difference signal to lie within the predetermined phase threshold, in response to determining that the phase difference signal does not lie within the predetermined phase threshold; and
performing said operation of correlating the phase difference signal with the predetermined access address is in response to said applying the correction to the phase difference signal.

25. The non-transitory machine-readable storage media of claim 23, wherein said operation of determining that the first access address decoding chain generated the correlation result that exceeds the correlation threshold comprises:
for the first access address decoding chain, determining that the number of matching symbols exceeds the correlation threshold; and
for the second access address decoding chain, determining that the number of matching symbols of does not exceed the correlation threshold.

26. The non-transitory machine-readable storage media of claim 23, wherein the operations further comprise applying a second frequency offset to the phase difference signal, wherein the second frequency offset is applied prior to the first frequency offset.

27. The non-transitory machine-readable storage media of claim 23, wherein the operations further comprise:
at each of the first access address decoding chain and the second access address decoding chain,
determining, after applying the first frequency offset, whether the phase difference signal lies within a predetermined phase threshold associated with a correlator of the access address decoding chain; and
performing said operation of correlating the phase difference signal with the predetermined access address is in response to determining that the phase difference signal lies within the predetermined phase threshold.

28. A first communication device comprising:
a network interface configured to:
receive a radio frequency (RF) signal comprising a packet from a second communication device;
an access address detection unit coupled with the network interface, the access address detection unit comprising a first access address decoding chain and a second access address decoding chain, wherein each access address decoding chain of the first access address decoding chain and the second access address decoding chain includes an adder and a correlator, wherein, at each access address decoding chain,
the adder is configured to apply a first frequency offset associated with the access address decoding chain to a phase difference signal determined from the RF signal,
the correlator is configured to correlate the phase difference signal with a predetermined access address associated with the first communication device to yield a correlation result; and
the access address detection unit is configured to determine that the correlation result associated with the first access address decoding chain exceeds a correlation threshold.

29. The first communication device of claim 28, further comprising a frequency offset estimation unit coupled with the network interface, the frequency offset estimation unit operable to apply a second frequency offset to the phase difference signal, wherein the second frequency offset is applied prior to the first frequency offset.

30. The first communication device of claim 28, wherein at each of the first access address decoding chain and the second access address decoding chain, the access address detection unit is operable to:
compare each symbol of the phase difference signal against a corresponding symbol of the predetermined access address; and
determine a number of matching symbols.

* * * * *